T. J. T. CUMMINGS.
Apparatus for Baking.
No. 124,256.
Patented March 5, 1872.
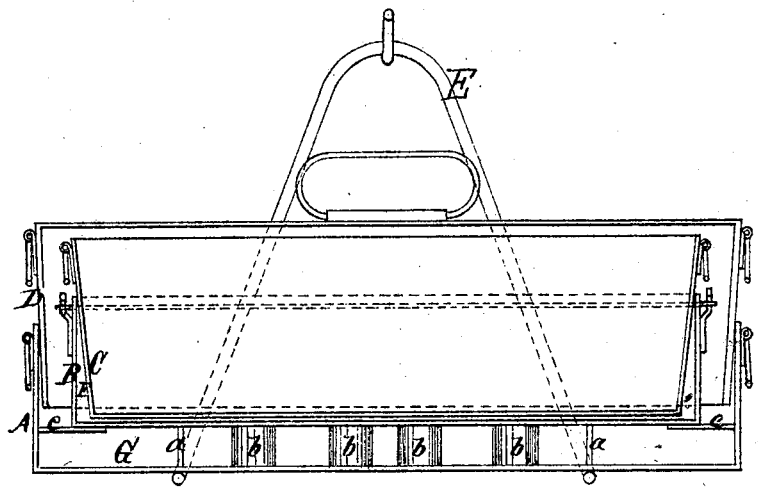
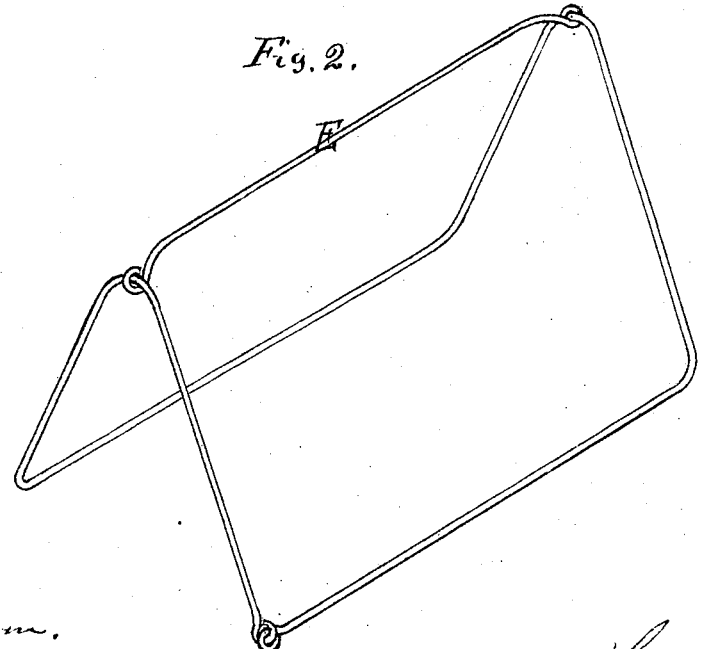

UNITED STATES PATENT OFFICE.

THOMAS J. T. CUMMINGS, OF FORT WAYNE, INDIANA.

IMPROVEMENT IN APPARATUS FOR BAKING AND ROASTING.

Specification forming part of Letters Patent No. 124,256, dated March 5, 1872.

SPECIFICATION.

*To all whom it may concern:*

Be it known that I, THOMAS J. T. CUMMINGS, of Fort Wayne, in the county of Allen and State of Indiana, have invented certain new and useful Improvements in Apparatus for Baking, Roasting, &c.; and I do hereby declare that the following is a full and exact description thereof, reference being had to the accompanying drawing and to the letters of reference marked thereon, in which—

Like letters refer to like parts in the different figures.

To enable others skilled in the arts to make and use my invention, I will proceed to describe its construction and operation.

In the drawing, Figure 1 represents a vertical section. Fig. 2 represents a perspective view of the holder.

The nature of my invention consists in the construction of an improved apparatus, as an article of manufacture, to be used for the purpose of baking bread, roasting meats, cooking vegetables, and otherwise preparing viands for table use. My invention consists in the combination, arrangement, and adjustment of a series of pans and supporters with an outside case constructed in two parts, thus forming a double air-chamber around the lower portion of the material which is being cooked, as will be hereinafter described. My invention relates also to the combination of said pans, the outside one of which is provided with suitable stops for the purpose of keeping it in a central position with the outside case. My invention further relates to the use of cylindrical supporters, which are made adjustable, to accommodate small vessels. My invention, in addition to the above, embraces the use of a holder in combination with the apparatus, as will be fully described.

In the drawing, A represents the base-pan, which forms the lower portion of the case. This pan is supplied with suitable transverse supporters $a$ $a$, which run across the bottom of said pan and serve as supports to any pan which may be used, as seen in Fig. 1. $b$ $b$ $b$ $b$ represent transverse sections of cylinders, which are of a height corresponding to the height of the supporters $a$ $a$, and are set on the bottom of said case, and serve to support small vessels. They may be adjusted so as to accomodate the apparatus in relation to position. B represents a pan, the sides of which are made perpendicular to its base, and is at its base, at each end, provided with stops $c$ $c$ to keep it in position while moving when in use. This pan rests on supporters $a$ $a$, and may be used singly for roasting coffee and other analogous purposes. Its diameter is somewhat less than that of the case, and, when held in a central position by stops $c$ $c$, it cannot come in contact with the outside case, but is surrounded by an air-chamber. This pan may be readily removed and replaced with another pan or several small vessels. C represents another pan, which is to be used for all ordinary cooking purposes—baking or raising bread, roasting meats, turkeys, &c. This pan is made in the form seen in Fig. 1, having its sides inclined so that, when placed in position for use, it fits snugly into the top of pan B and extends thence down to near the bottom of said pan, as seen in Fig. 1, leaving a small space between the bottoms of the two pans and around the sides of pan C, up as far as pan B extends, while the upper portion of said pan C is in the outside air-chamber. Thus, it will be seen that while the whole is exposed to an intense heat within the outer chamber the lower portion of pan C is surrounded by a considerably-modified heat, which, while being sufficient for the purpose, is still not of that intense character that will burn or scorch the food, or form a strong crust, which would otherwise be formed, and which always adheres with great tenacity to the surface of the pan, causing, frequently, much trouble. Food may in this way be cooked rapidly and thoroughly without the great disadvantage of being overdone on the outside and rare done on the inside. D represents the upper portion of the case, which is made so as to fit snugly into the under or lower portion A, as seen in figure, thus closing in the baking-pans and forming an air-chamber, which prevents the escape of a large portion of the steam and gases generated by the heat, and thus allowing the latter to thoroughly impregnate the meats, &c., being cooked, greatly improving and enriching their flavor. E represents a holder, constructed by bending wire in the form seen in Fig. 2. This holder is used by passing the hand through it and drawing the baker to the position Fig. 1, when it may be removed as desired.

What I claim as new, and desire to secure, is—

1. The pan C, in combination with pan B and case A, each being constructed and arranged so as to form a double air-chamber, F and G, for the purposes described.

2. Also, pan B, provided with stops $c\ c$, in combination with case A and supporters $a\ a$, for the purpose specified.

3. Also, holder E, in combination with the apparatus, for the purpose specified.

4. Also, the adjustable supporters $b\ b\ b\ b$, constructed and used for the purpose and in the manner specified.

T. J. T. CUMMINGS.

Attest:
 H. F. WILLSON,
 A. D. MYERS.